Nov. 26, 1968

E. W. BUSHNELL 3,412,830

AUTOMATIC BRAKE SLACK ADJUSTER

Filed Dec. 2, 1966

Inventor:
Eldon Wayne Bushnell
By Walter L. Schlegel, Jr
Russell W. Pyle
Attys

United States Patent Office 3,412,830
Patented Nov. 26, 1968

3,412,830
AUTOMATIC BRAKE SLACK ADJUSTER
Eldon Wayne Bushnell, Lansing, Ill., assignor to Amsted Industries Incorporated, Chicago, Ill., a corporation of New Jersey
Filed Dec. 2, 1966, Ser. No. 598,656
4 Claims. (Cl. 188—203)

ABSTRACT OF THE DISCLOSURE

A slack adjuster for railway brake rigging interconnects a brake lever and a brake shoe. The slack adjuster is automatically adjusted by interaction of a cam surface on the lever and a pawl ratchet assembly mounted on a movable carrier that contacts the cam. The adjuster may also be manually adjusted by a wrench when the brake rigging is in a released position.

---

This invention relates to brakes and more particularly to a slack adjuster assembly for railway brake rigging.

Present brake systems are designed so that movement-inhibiting brake shoes are forcefully applied to rotating members of the railway car in order to inhibit the motion and halt the car. Often those rotating members are the car wheels themselves; they may also be brake disks rigidly attached to the wheels or axles.

Repeated forceful application of the brake shoes to wheels or disks will frictionally induce great wear in the contacting brake shoes. Such wear has the effect of moving the brake shoe surface progressively farther away from the rotating braked surface, when the brakes are at rest in the unapplied state. Put differently, a brake assembly must travel progressively further and further to contact the braked surface as wear removes more and more of the brake shoe.

This increase of travel required of brake apparatus, in turn, leads to wear in brake parts and to general ineffectiveness of the system, since the system must operate with parts in optimum relative positions. For instance, air cylinder piston travel must increase in order to move the worn brake apparatus the increased distance to make contact with the wheels. Such increase in piston travel increases wear upon this especially difficult-to-replace part.

Slack adjusters, used to adjust the position of the brake shoe assembly relative to the rest of the brake assembly, are well known in the art. By means of these devices, the distance between the contact surface of the shoe in its released position may be kept substantially constant, thus overcoming the difficulties described above.

None of these devices, however, automatically adjust such distance, each time the brakes are applied on a vehicle so equipped, while also allowing manual adjustment of the brakes when such brakes are in the released position in a manner such as that described below.

It is an object, then, of this invention to provide an automatic slack adjuster compact in size, and durable in construction.

Another object of my invention to provide an automatic slack adjuster which, in the released position, may be manually operated to increase or decrease brake shoe clearance.

These and other objects of the invention will become apparent from an examination of the following description and accompanying drawings, wherein:

FIGURE 2 is an elevational side view in cross-section of the slack adjuster of this invention;

FIGURE 3 is an elevational end view with the slack adjuster housing partly broken away along the plane of line 3—3 of FIGURE 2; and FIGURE 4 is a top plan view in cross-section, taken along the plane of line 4—4 of FIGURE 3, showing more clearly the arrangement of the pawl mechanism of my invention.

Figure 1:
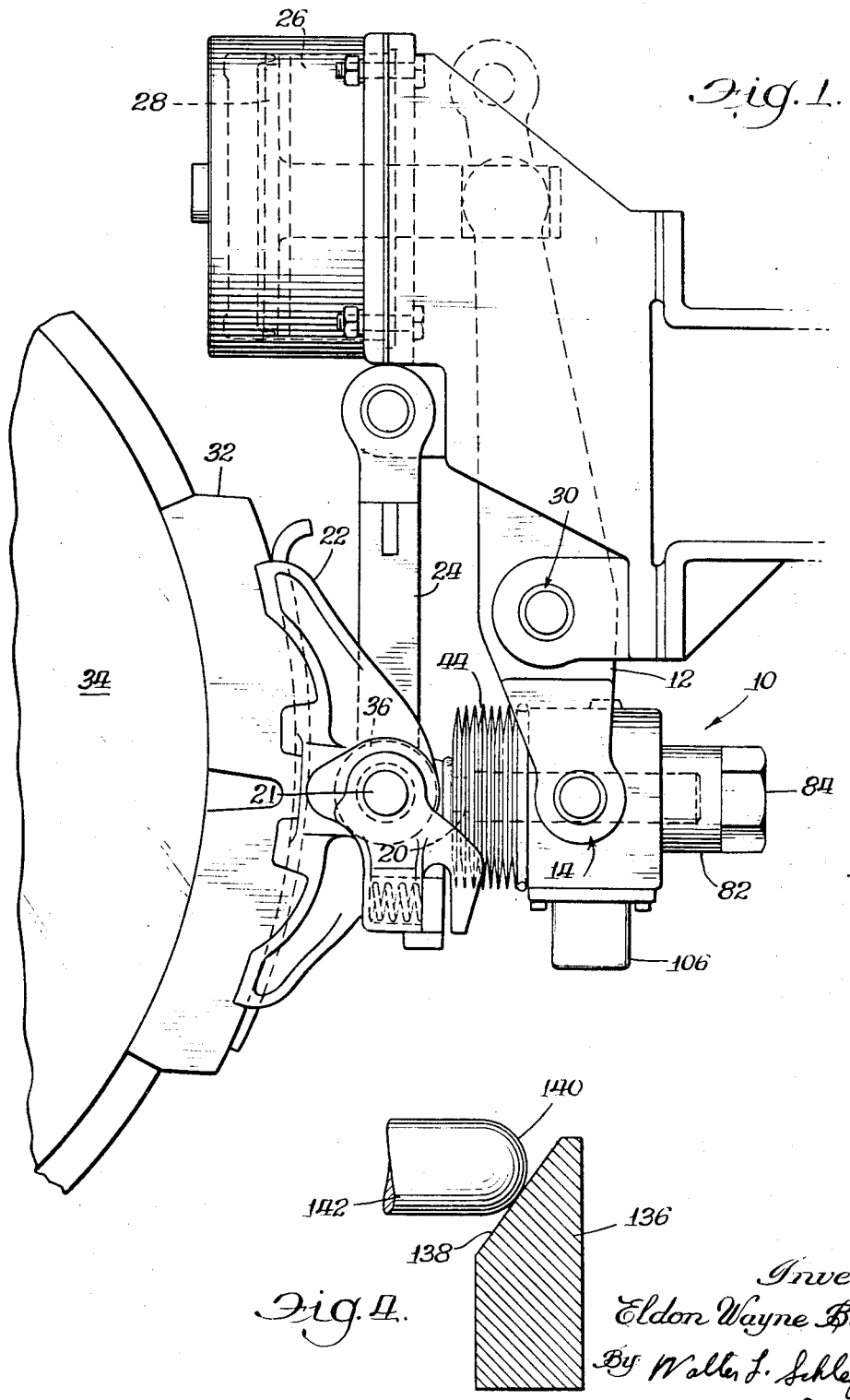
FIGURE 1 is an elevational view of a conventional brake mechanism provided with the slack adjuster of this invention.

Referring now to FIGURE 1, it will be seen that the slack adjuster, indicated generally at 10, is journalled in the brake dead lever 12 by trunnions 14. The eye 18 (FIG. 2) of the screw 20 is pivoted at 21 (FIG. 1) to the brake head 22 and the brake link 24. When compressed air is introduced into the chamber 26, the piston 28 is forced to the right in FIGURE 1. This motion pivots the dead lever 12 about the fixed fulcrum 30, and in turn, forces the slack adjuster 10, the brake head 22, and the brake shoe 32 to the left. The brake shoe 32 thus contacts the railroad wheel 34 to retard its rotation.

Referring now to FIGURE 2 for a more detailed view of the slack adjuster, the slack adjuster assembly 10 includes a screw, indicated generally at 20, having at one end a non-threaded portion or head 36 presenting an eye 18 for connection in the usual manner at 21 (FIG. 1) to the brake head 22 (FIG. 1). At the other end the screw has a cylindrical threaded portion 40 which is disposed to extend into a housing 42. The bore of the housing 42 has an opening 43 at one end for receiving the threaded portion of the screw.

In order to provide a water-tight and dirt-tight connection between the screw 20 and the opening 43, the head 36 of the screw 20 and the opening 43 may be interconnected by a cylindrical expandable rubber boot 44 which has opposite ends 46 and 48 secured within cylindrical grooves 50 and 52 in the outer surfaces of the screw head 36 and housing 42, respectively. The ends 46 and 48 of the boot 44 may be maintained in the grooves 50 and 52 by wires or spring clips 54 and 56.

The housing 42 is generally cylindrical in outward appearance. In the interior, housing 42 is divided into three co-axial cylindrical sections, which may be termed an open-end section 58, an intermediate section 60, and a rear or closed-end cavity 62.

Rotatably mounted within the open-end and intermediate sections 58 and 60 of the housing cavity 42 is a generally cylindrical collar 63 having a body 64 through which extends axially a central cylindrical bore 66, a portion of which is threaded at 68 for engagement with threaded portion 40 of screw 20. The body 64 of the collar 63 has extending radially outwardly therefrom, adjacent one end thereof, a larger and smaller annular flange 70 and 72, respectively, which are disposed within the open-end and intermediate sections 58 and 60 of the housing cavity 42. The larger flange 70 is disposed between housing abutment 74 and a resilient retainer ring 76 removably positioned within an annular groove 78 formed in the large open-end cavity 58. The abutment 74 and the retainer ring 76 are spaced from each other a distance approximately equal to the width of the flange 70 to engage opposite sides of the flange and thereby prevent its axial movement relative to the housing. Thus, the collar 63 is free to rotate within the housing 42 and its rotation will, by virtue of its threaded connection to the screw 20, effect an axial or linear movement of the screw 20 relative to the housing 42 so as to change the distance between the brake elements which are interconnected by the slack adjuster device, as set out above.

The opposite end of collar body 64 extends through an opening 80 in the housing 42, and is provided with a collar body extension 82. The collar body extension 82 terminates in a nut formation 84 adapted to fit a wrench. The opening 80 is provided with a notch 86 into on the ratchet, means on said carrier for releasable engaging the pawl with the ratchet teeth, and means responsible to movement of the lever to release position for disengaging the pawl from the ratchet teeth, said pawl and ratchet being formed and arranged so that the pawl rides freely over the teeth of the ratchet as the carrier moves in response to engagement of the lever cam surface with said end as the lever moves to applied position.

References Cited

UNITED STATES PATENTS 2,118,236   5/1938   Schwentler.
2,913,071   11/1959   Mueller.
3,121,478   2/1964   Bostwick.

DUANE A. REGER, *Primary Examiner.*